(12) United States Patent
Becker et al.

(10) Patent No.: US 10,792,866 B2
(45) Date of Patent: Oct. 6, 2020

(54) THERMOPLASTIC FRICTIONAL CONNECTOR

(71) Applicant: EJOT GmbH & Co. KG, Bad Berleburg (DE)

(72) Inventors: Mirko Becker, Hesselbach (DE); Steffen Lorenz, Biedenkopf (DE); Ingo Krausser, Biedenkopf (DE)

(73) Assignee: EJOT GmbH & Co. KG, Bad Berleburg (DE)

( * ) Notice: Subject to any disclaimer, the term of this patent is extended or adjusted under 35 U.S.C. 154(b) by 235 days.

(21) Appl. No.: 15/736,771

(22) PCT Filed: Jun. 15, 2016

(86) PCT No.: PCT/EP2016/063781
§ 371 (c)(1),
(2) Date: Dec. 14, 2017

(87) PCT Pub. No.: WO2016/202876
PCT Pub. Date: Dec. 22, 2016

(65) Prior Publication Data
US 2018/0169958 A1    Jun. 21, 2018

(30) Foreign Application Priority Data

Jun. 15, 2015   (DE) .......................... 10 2015 210 963

(51) Int. Cl.
*B29C 65/06*    (2006.01)
*B29C 65/00*    (2006.01)
(Continued)

(52) U.S. Cl.
CPC ............ *B29C 65/06* (2013.01); *B29C 65/069* (2013.01); *B29C 65/0672* (2013.01);
(Continued)

(58) Field of Classification Search
CPC .......... F16B 5/04; F16B 19/04; F16B 37/065; B29C 65/06; B29C 65/0672;
(Continued)

(56) References Cited

U.S. PATENT DOCUMENTS 2,942,748 A    6/1960   Anderson
5,536,344 A    7/1996   van Dreumel
(Continued)

FOREIGN PATENT DOCUMENTS

CN    102615508 A    8/2012
CN    103240564 A    8/2013
(Continued)

OTHER PUBLICATIONS

Machine translation of JP 2006-167918 date unknown.*
(Continued)

*Primary Examiner* — John L Goff, II
(74) *Attorney, Agent, or Firm* — Womble Bond Dickinson (US) LLP; Joseph Bach, Esq.

(57) ABSTRACT

The invention relates to a method for producing a component bond (70, 140) comprising: a fastening structure (60, 160) that has at least one component layer (60; 160a, 160b); and a thermoplastic connecting element (10, 110) having a head (12) and a shank (14), in which method the connecting element (10, 110) is driven into the fastening structure (60, 160) under pressure whilst rotating, such that the shank (14) penetrates the fastening structure (60, 160). The connecting element (10, 110), after penetrating the fastening structure (60, 160), is converted by friction into a softened, free-flowing state in a die (44, 144) which is placed against the fastening structure (60, 160) in the opposite direction to the driving direction, resulting in a thicker section (22, 22) that extends beyond the radial extent of some sections of the shank (14). The fastening structure (60, 160) is thus interlockingly held between the head (12) and the thicker section (22, 122).

3 Claims, 4 Drawing Sheets

(51) Int. Cl.
  *B29C 65/60* (2006.01)
  *F16B 37/06* (2006.01)
  *F16B 5/04* (2006.01)
  *B29C 65/56* (2006.01)
  *B29L 31/00* (2006.01)

(52) U.S. Cl.
  CPC ............ *B29C 65/56* (2013.01); *B29C 65/602* (2013.01); *B29C 65/607* (2013.01); *B29C 66/11* (2013.01); *B29C 66/1122* (2013.01); *B29C 66/21* (2013.01); *B29C 66/41* (2013.01); *B29C 66/474* (2013.01); *B29C 66/49* (2013.01); *B29C 66/53* (2013.01); *B29C 66/7392* (2013.01); *B29C 66/81429* (2013.01); *B29C 66/81431* (2013.01); *B29C 66/83221* (2013.01); *F16B 5/04* (2013.01); *F16B 37/065* (2013.01); *B29L 2031/7288* (2013.01)

(58) Field of Classification Search
  CPC ..... B29C 65/069; B29C 65/60; B29C 65/602; B29C 65/607; B29C 66/49; B29C 65/56
  USPC ........................................ 156/73.5
  See application file for complete search history.

(56) References Cited

U.S. PATENT DOCUMENTS

| | | | |
|---|---|---|---|
| 6,153,035 | A | 11/2000 | Van Laeken |
| 2016/0084290 | A1* | 3/2016 | Chung .................. B21J 15/02 29/525.06 |
| 2016/0091009 | A1* | 3/2016 | Wang .................. B21J 15/147 29/524.1 |

FOREIGN PATENT DOCUMENTS

| | | | |
|---|---|---|---|
| DE | 3817119 | A1 | 12/1988 |
| DE | 102011118816 | A1 | 5/2012 |
| DE | 102011001522 | A1 | 9/2012 |
| DE | 102013209634 | A1 | 11/2014 |
| DE | 102013109634 | A1 | 3/2015 |
| DE | 102015112679 | A1 | 2/2016 |
| FR | 1424663 | A | 1/1966 |
| JP | 55-121024 | A | 9/1980 |
| JP | 02-248236 | A | 10/1990 |
| JP | 2004-284298 | A | 10/2004 |
| JP | 2006167918 | A * | 6/2006 |
| JP | 2013-148122 | A | 8/2013 |
| WO | 1991-011309 | A2 | 8/1991 |
| WO | 1993-012344 | A1 | 6/1993 |
| WO | 2005-092596 | A1 | 10/2005 |
| WO | 2015-135824 | A1 | 9/2015 |
| WO | 2015-162029 | A1 | 10/2015 |

OTHER PUBLICATIONS

International Search Report and Written Opinion for PCT/EP2016/063781 dated Nov. 2, 2016.
Search Report for German Patent Application No. 102015210963.1 dated Mar. 9, 2016.
Second Notification of Office Action for Chinese Application No. 2016800454073, 11 pages.

* cited by examiner

THERMOPLASTIC FRICTIONAL CONNECTOR

RELATED APPLICATIONS

This application is the national phase of International Application No. PCT/EP2016/063781, filed on Jun. 15, 2016, which claims priority to and the benefit of German Patent Application No. 102015210963.1, filed on Jun. 15, 2015, the disclosures of which are hereby incorporated by reference herein in their entireties.

The invention relates to a method for producing a component connection comprising a fastening structure and a thermoplastic connecting element, as well as to a thermoplastic connecting element.

DE 10 2013 209 634 A1 relates to a fastening element for a fiber composite component. This fastening element includes a thermoplastic section. This thermoplastic fastening element is used to produce an interlocking connection between the fastening element and the fiber composite component by hot deformation, in particular hot staking.

It is the object of the invention to provide an improved method for producing a component bond connection of this type, as well as a fastening element.

This object is accomplished by the features of claim 1 in combination with the features of its preamble.

Described in the dependent claims are advantageous further developments of the invention.

In a known manner, the fastening structure comprises at least one component layer in which the connecting element is fastened. The connecting element has a head and a shank.

In accordance with the invention, the connecting element is driven into the fastening structure under pressure whilst rotating, such that the shank penetrates the fastening structure. Once it has penetrated the fastening structure, the connecting element is softened by friction in a die and converted into a free-flowing state which allows the connecting element to be deformed in the region of its tip.

For this purpose, the die is applied to the fastening structure in a direction opposite the driving direction. Introducing the frictional energy in this manner causes the connecting element to be softened and deformed, resulting in a thicker section which extends beyond the radial extent of the shank. The die is removed from the connection point after a certain hardening period. The connecting element is thus positively connected to the fastening structure.

Using the frictional energy to soften the connecting element has the advantage that it provides a purely mechanical joining technology. This makes it relatively easy to design dies and driving tools.

In another advantageous embodiment of the invention, the thermoplastic connecting element is introduced through a pilot hole preformed in the fastening structure. This has the advantage that this component does not have to have hole-forming properties.

In another aspect of the invention, the component is a thermoplastic connecting element for performing the above mentioned method. For this purpose, the connecting element preferably has a head and an adjoining shank. Provided in the head is a drive which can be used to rotate the connecting element so that it can be softened and deformed in a die which is placed against the fastening structure.

In yet another advantageous embodiment, the shank's front face is obtuse-angled or planar in design. This provides a maximum frictional surface so as to promote softening of the connecting element.

Furthermore, it may advantageously be provided for the connecting element to have a central, in particular cylindrical, recess made into its head and shank. During assembly, a tool can engage in this recess and thus stabilize the connecting element during the melting process, and on the other side, once the connecting element has been introduced, it can serve as an anchor for securing another element therein, in particular as a kind of plug for a screw, in particular for a self-tapping screw.

A particularly advantageous design results when the internal drive and the central recess are arranged coaxially. This additionally optimizes the use of the internal drive.

In yet another aspect of the invention, the invention relates to a setting tool for connecting a connecting element as described above in a method as described above.

The setting tool comprises a driving tool and an abutment or counter die with a shaped recess, which driving tool is adapted to rotationally drive a connecting element and furthermore the counter die and the driving tool are adapted to be moved toward each other axially.

In an advantageous further development, the driving tool has a drive section and a stabilizing section, which latter is in the form of a central shank adapted to be slidingly inserted into a recess provided in a connecting element.

Preferably, the shaped recess may be concave, in particular shaped like a spherical cap, or of a frusto-conical design.

In yet another embodiment, the counter die may have a central recess adapted to be engaged by the central shank of the drive element.

In yet another aspect of the invention, the invention relates to a component connection comprising a fastening structure with a least one component layer. A thermoplastic connecting element extends through this fastening structure. The head of this connecting element, which is provided with a drive, rests against the upper end of the fastening structure, and its lower end has a thicker section which rests against the surface of the fastening structure which is located opposite the head.

In a further development, a central recess is provided in the connecting element which extends through the fastening structure.

Additional advantages, features and possible applications of the present invention may be gathered from the description which follows and by reference to the embodiments illustrated in the drawings.

Figure 1:
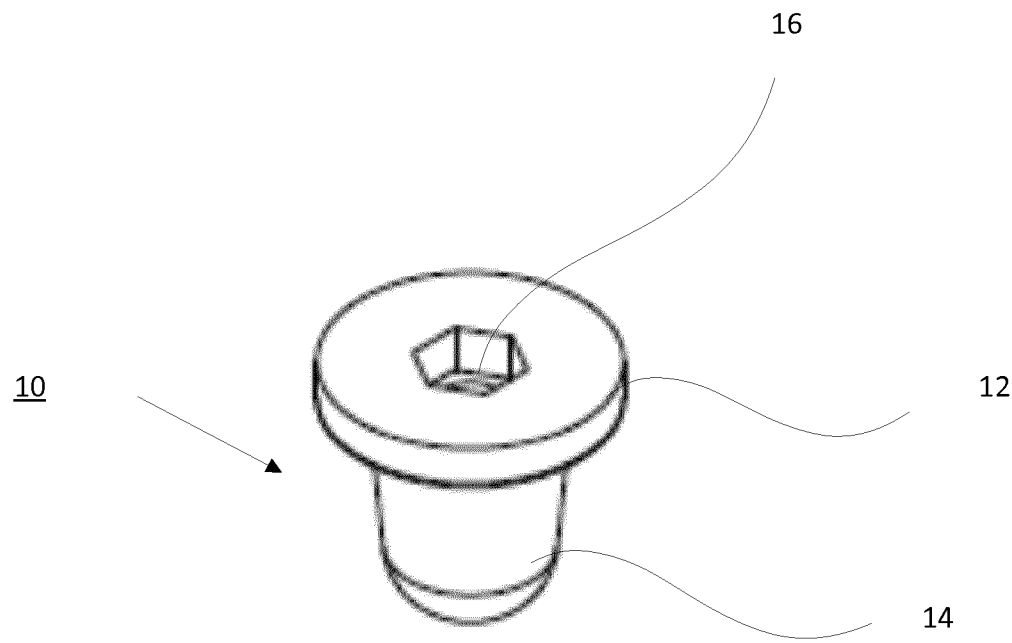
FIG. 1 is a perspective view of a connecting element according to the invention.

FIG. 1 is a perspective view of a thermoplastic connecting element 10 according to the invention. The connecting element 10 has a head and a shank 14. An internal drive 16 in the form of a hexagon is provided in the head 12.

Figure 2:
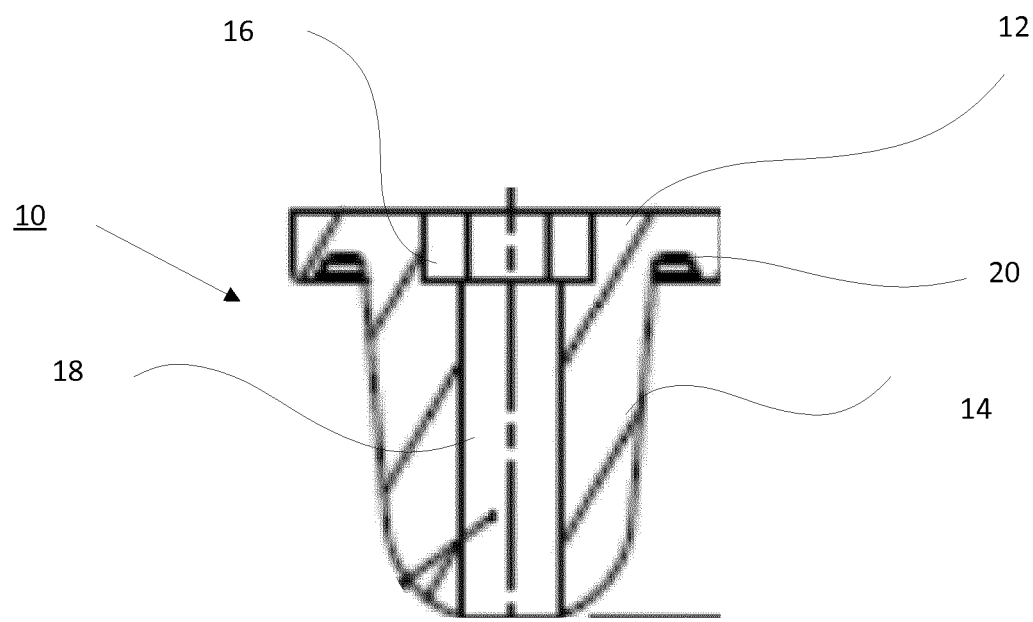
FIG. 2 is a sectional view of a connecting element according to the invention as shown in FIG. 1.

FIG. 2 is a sectional view of the inventive thermoplastic connecting element 10 of FIG. 1. As can be seen here, adjoining the drive is a central cylindrical recess 18. This recess 18 extends over the entire length of the connecting element. On its shaft side, the head 12 is provided with a groove 20. As may further be gathered from FIG. 2, the internal drive 16 and the recess 18 extend coaxially to each other. This has the advantage that a tool can be used both to engage the drive and to support the connecting element.

Figure 3A:
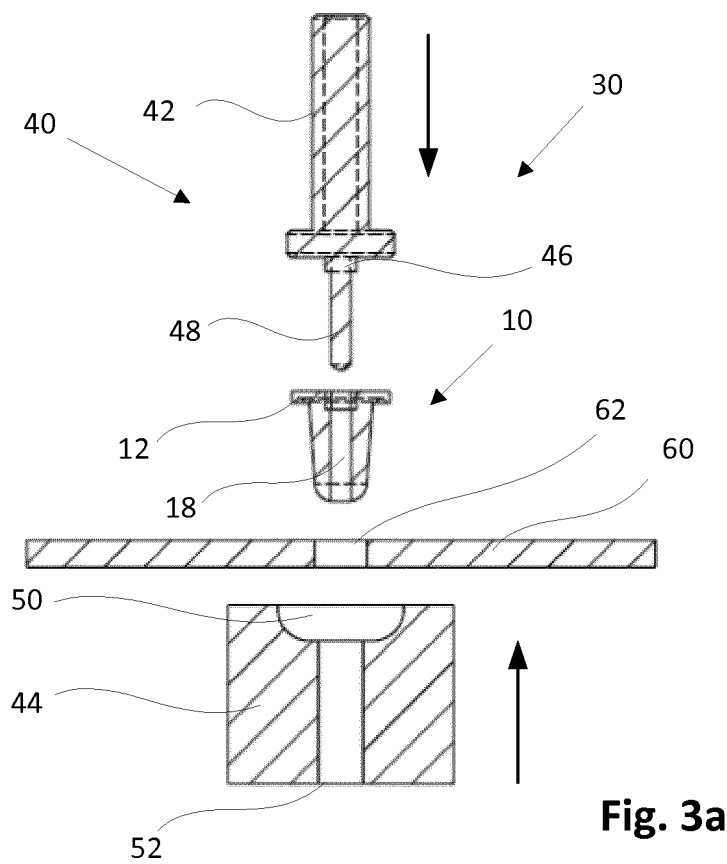
FIG. 3a is a sectional view of a setting arrangement.

FIG. 3a is a view of a setting arrangement 30 according to the invention. The setting arrangement 30 includes a setting tool 40 comprising a driving tool 42 and an abutment or counter die 44. A setting tool 40 of such design is used to establish a connection between a fastening structure 60 and a connecting element 10 according to the invention. The driving tool 42 has a driving section 46 and a stabilizing section 48. In this embodiment, the driving tool 42 and the counter die 44 are adapted to be displaced relative to each other, with the connecting element 10 being rotated via the drive section 46, which results in frictional energy being generated on the counter die 44, which friction is sufficient to partially soften the thermoplastic connecting element 10. According to the invention, the counter die 44 as well as the driving tool 42 are aligned at a hole 62 provided on either side of the fastening structure 60. The counter die 44 has a shaped recess 50 in which the thermoplastic connecting element 10 is softened and deformed, whereupon the molten material of the connecting element 10 fills up the shaped recess 50. The counter die 44 additionally has a cylindrical bore 52 into which the stabilizing section 48 of the drive tool 42, which section 48 is designed as a shank, can be introduced. This allows the connecting element 10 to be softened against the counter die 44, although the stabilizing section 48 completely penetrates the connecting element 10 during the fastening operation. The design of the shaped recess 50 in the counter die 44 has been chosen so as to cause the connecting element 10 to widen therein such that the fastening structure 60 is interlockingly held between the head 14 and the resulting thicker section. Such a component connection is described with reference to FIG. 3c.

Figure 3B:
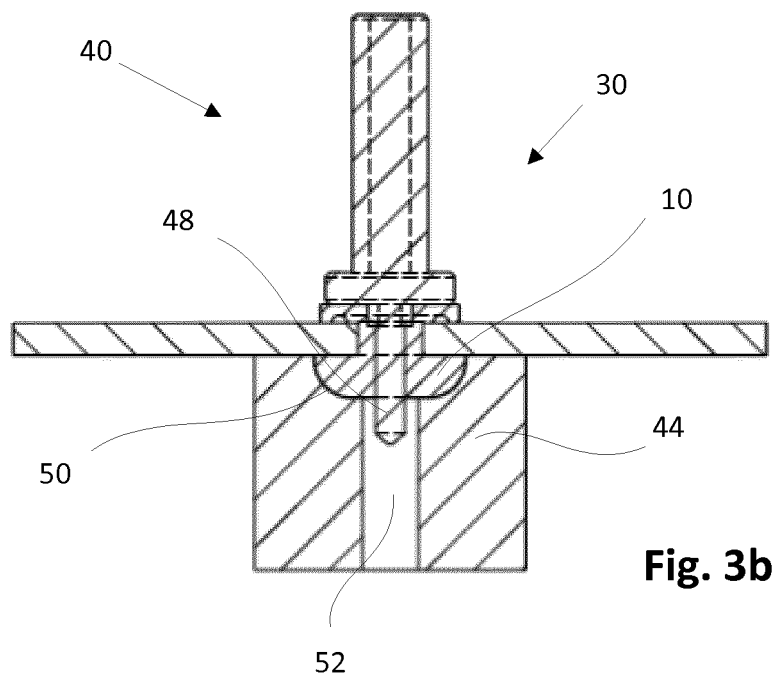
FIG. 3b is a sectional view of a setting arrangement during a setting operation.

Illustrated in FIG. 3b is a setting arrangement 30 according to the invention, in an operating state thereof, in which the setting tool 40 has frictionally heated the connecting element 10 against the counter die 44 to such an extent that it fills up the shaped recess 50. During the driving-in process, the stabilizing section 48 penetrates the connecting element 10 and ultimately enters a recess 52 provided in the counter die 44. After partial softening of the connecting element 10 in the shaped recess 50, the previously softened section of the connecting element 10 can be left to harden therein whilst rotation is stopped.

Figure 3C:
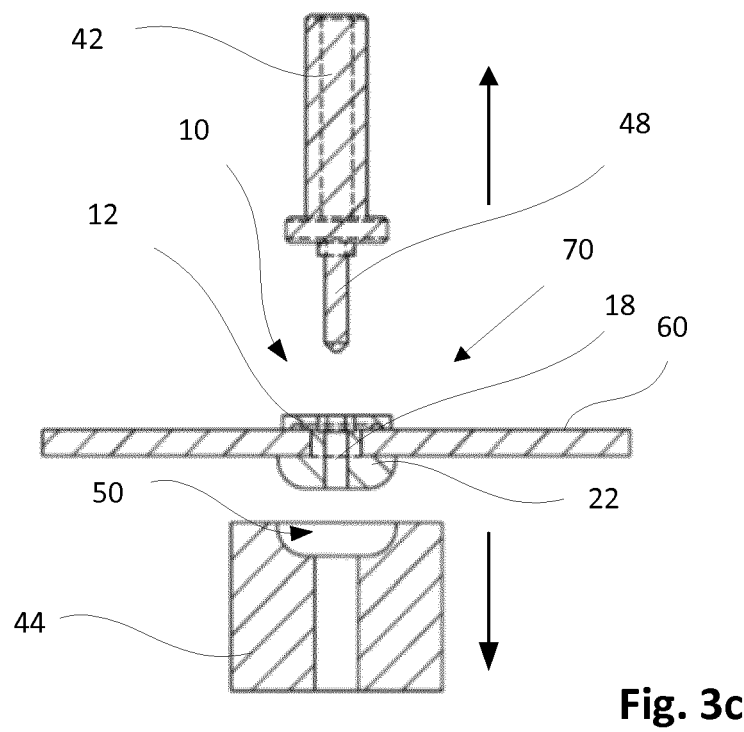
FIG. 3c is a sectional view of a component connection according to the invention after the setting operation.

Shown in FIG. 3c is a completed component connection 70 comprising a connecting element 10 which has its head 12 resting on the upper side of the fastening structure 60, whereas a thicker section 22, in particular in the shape of the shaped recess 50, has been created at the underside. The connecting element 10 is thus positively connected to the fastening structure 60 by the head and the thicker section 22. The stabilizing section 48 of the driving tool 42 which penetrates the connecting element 10 during the connecting process ensures that the cylindrical recess 18 of the connecting element 10 remains fully intact even after the connecting process. The connecting element 10 is thus particularly suited for receiving a self-tapping screw so as to secure the latter to the component connection 70. In the view of FIG. 3c, the counter die 44 and the driving tool 42 are disposed remote from the connection point.

This is a simple way of producing a positive integral connection in that the required melting temperature is achieved through the application of frictional energy.

Figure 4A:
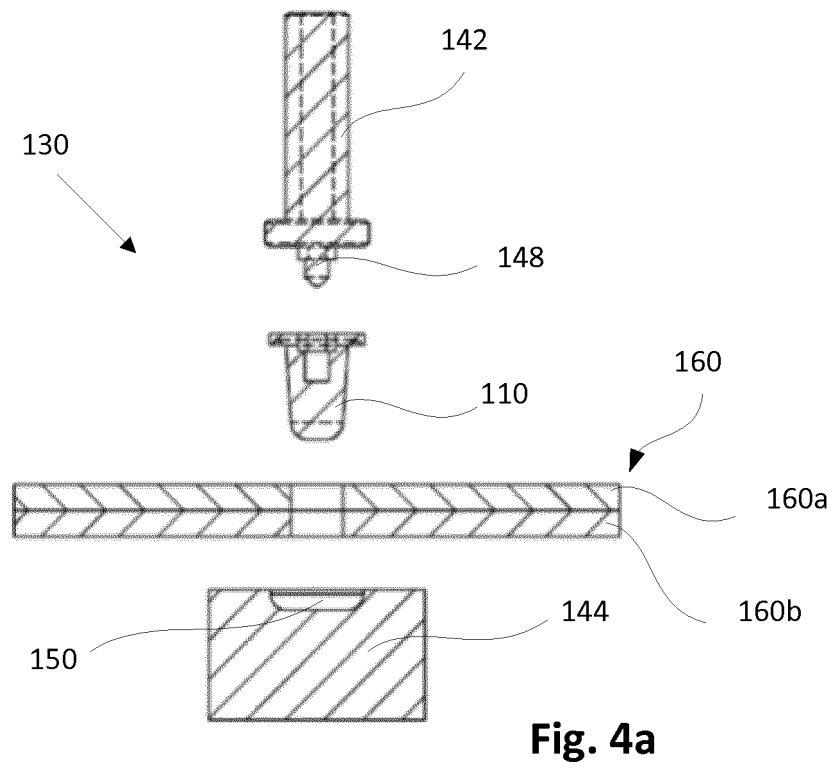
FIG. 4a is a view of a component connection according to the invention.

FIG. 4a is an inventive arrangement for producing a component connection comprising a fastening structure 160 which consists of two component layers 160a, 160b. A connecting element 110 is introduced into the prepunched fastening structure 160. For this purpose, a setting arrangement 130 is provided which has a driving tool 142 for rotating the connecting element 110 and applying an axial pressing force to it so as to displace the connecting element 110 towards and into contact with a counter die 144 where it is softened through the application of frictional energy. The connecting element 110 of FIG. 4a to FIG. 4c does not have a continuous recess, for which reason the stabilizing section 148 also has a smaller axial extent. The counter die 144 to be applied against the underside of the fastening structure 160 has a shaped recess 150 which is closed in the driving direction. The connecting element 110, in an axial direction thereof toward the tip, has a recess adjoining an internal drive 116. The recess is adapted to receive the stabilizing section 148 of the driving tool 142 therein.

Figure 4B:
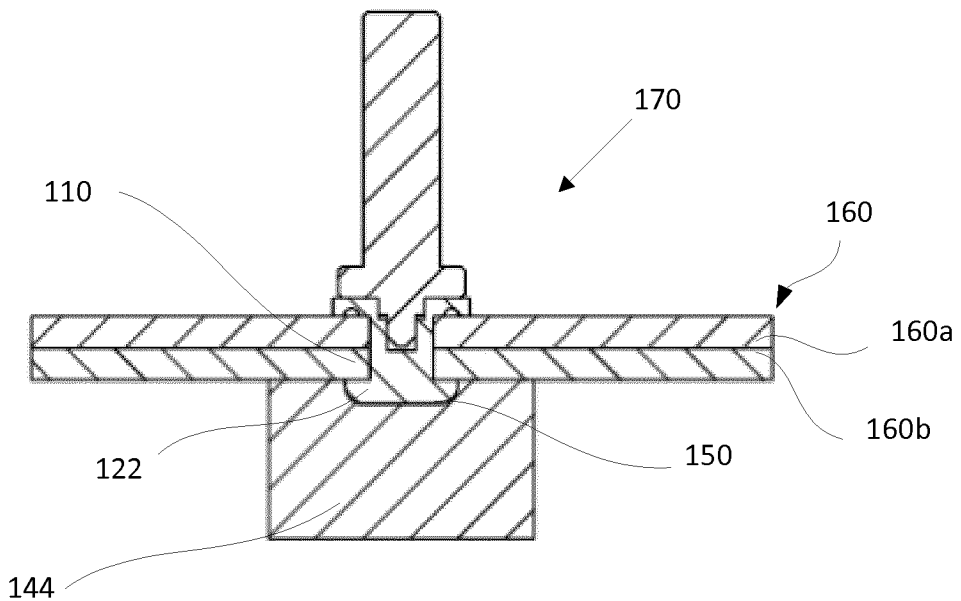
FIG. 4b is a sectional view during a fastening operation.

FIG. 4b is a lateral view during the fastening operation, in which the connecting element 110 forms a radially thicker section 122 at its end facing away from its head as it is exposed to friction in the counter die 144. As illustrated, the component connection 170 comprises the fastening structure 160 and the connecting element 110, in which the connecting element 110 holds the two component layers 160a, 160b of the fastening structure together and at the same time constitutes a receiving element for additional components. In this embodiment, because the connecting element 110 has a closed surface in the region of its thicker section 122, a certain extent of sealing against the prepunched fastening structure 160 can be achieved once the connection has been completed.

Figure 4C:
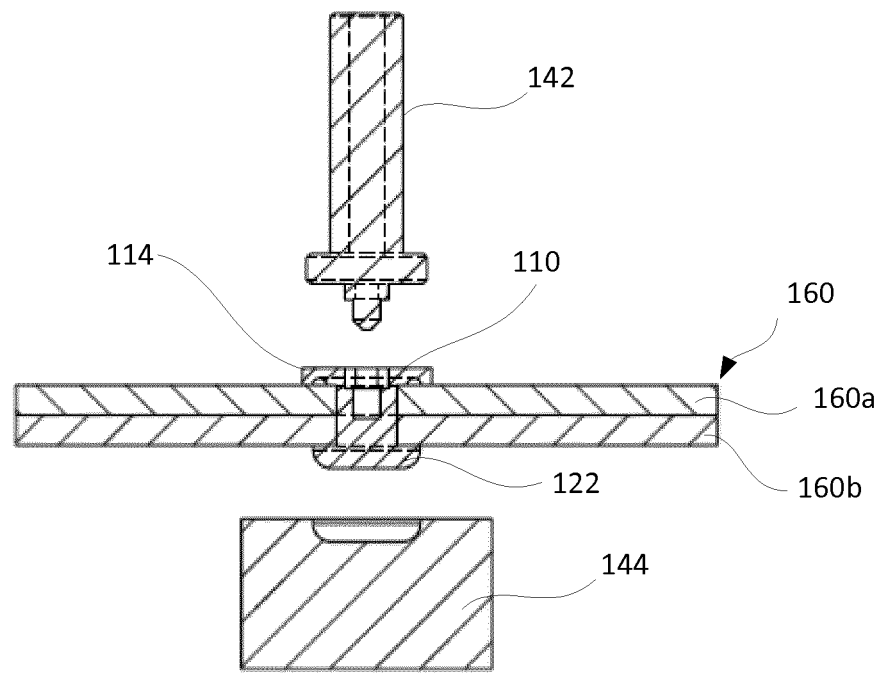
FIG. 4c is a view of an arrangement according to the invention for producing a component connection.

FIG. 4c illustrates how the component layers 160a, 160b are connected by a connecting element 110 after removal of the driving tool 142 and the counter die 144, and how these layers 160a, 160b are interlockingly held in an axial direction between the head 114 and the resulting thicker section 122. The connecting element 110 thus serves to connect the two component layers 160a, 160b and at the same time provides a receiving point for another fastening element such as a screw, in particular a self-tapping screw.

The invention claimed is:

1. Method for producing a component connection (70, 140) comprising a fastening structure (60, 160) that has at least one component layer (60; 160a, 160b) and a thermoplastic connecting element (10, 110) having a head (12) and a shank (14), the connecting element has a central cylindrical recess and internal drive arranged coaxially relative to one another, in which method a driving tool is inserted through the central cylindrical recess so as to engage the internal drive by a drive section of the driving tool and to completely penetrate the connecting element by a stabilizing section of the driving tool, and then the connecting element (10, 110) is driven into the fastening structure (60, 160) under pressure whilst rotating such that the shank (14) penetrates the fastening structure (60, 160), wherein the connecting element (10, 110), after penetrating the fastening structure (60, 160), is converted by friction into a softened, free-flowing state in a die (44, 144) which is placed against the fastening structure (60, 160) in the opposite direction to a driving direction of the shank, resulting in a thicker section (22, 122) that extends beyond a radial extent of some sections of the shank (14), the fastening structure (60, 160)

thus being interlockingly held between the head (12) and the thicker section (22, 122) and thereafter removing the driving tool from the connecting element and, wherein before the connecting element is driven into it, a pilot hole is made in the fastening structure, which pilot hole has a diameter that is less or the same as the diameter of the shank of the connecting element.

2. Method according to claim 1, characterized in that the fastening structure (60, 160) is constituted by a single component layer (60) or a plurality of component layers (160a, 160b).

3. Method according to claim 1, characterized in that the die is removed after the softened and deformed connecting element (10, 110) has hardened.

* * * * *